(12) United States Patent
Payne et al.

(10) Patent No.: US 9,977,716 B1
(45) Date of Patent: May 22, 2018

(54) INCREMENTAL BACKUP SYSTEM

(71) Applicant: Veritas Technologies LLC, Mountain View, CA (US)

(72) Inventors: Michael A. Payne, Gainesville, FL (US); Steven R. DeVos, Mercer Island, WA (US)

(73) Assignee: Veritas Technologies LLC, Mountain View, CA (US)

( * ) Notice: Subject to any disclaimer, the term of this patent is extended or adjusted under 35 U.S.C. 154(b) by 373 days.

(21) Appl. No.: 14/754,603

(22) Filed: Jun. 29, 2015

(51) Int. Cl.
*G06F 17/00* (2006.01)
*G06F 11/14* (2006.01)
*G06F 11/30* (2006.01)
*G06F 17/30* (2006.01)

(52) U.S. Cl.
CPC ...... *G06F 11/1451* (2013.01); *G06F 11/3065* (2013.01); *G06F 17/30088* (2013.01)

(58) Field of Classification Search
CPC ......... G06F 17/30088; G06F 17/30315; G06F 17/30
USPC .................................................. 707/600-899
See application file for complete search history.

(56) References Cited

U.S. PATENT DOCUMENTS

| | | | |
|---|---|---|---|
| 6,085,298 A | 7/2000 | Ohran | |
| 6,101,585 A | 8/2000 | Brown et al. | |
| 6,249,792 B1 | 6/2001 | Zwilling et al. | |
| 6,460,054 B1 | 10/2002 | Grummon | |
| 6,665,815 B1 | 12/2003 | Goldstein et al. | |
| 6,829,688 B2 | 12/2004 | Grubbs et al. | |
| 6,847,983 B2 | 1/2005 | Somalwar et al. | |
| 6,880,051 B2 | 4/2005 | Timpanaro-Perrotta | |
| 6,981,177 B2 | 12/2005 | Beattie | |
| 7,310,654 B2 | 12/2007 | McNeil | |
| 7,814,056 B2 | 10/2010 | McGrattan et al. | |
| 8,005,797 B1 | 8/2011 | Chepel et al. | |
| 8,635,187 B2 | 1/2014 | Beatty et al. | |
| 2004/0268068 A1 | 12/2004 | Curran et al. | |
| 2006/0075294 A1 | 4/2006 | Ma et al. | |
| 2006/0161802 A1 | 7/2006 | Wang et al. | |
| 2006/0218204 A1 | 9/2006 | Ofer et al. | |
| 2006/0242211 A1 | 10/2006 | Becker et al. | |
| 2007/0174325 A1 | 7/2007 | Mooney et al. | |
| 2008/0244204 A1 | 10/2008 | Cremelie et al. | |

(Continued)

FOREIGN PATENT DOCUMENTS

WO 2004/034197 4/2004

OTHER PUBLICATIONS

European Search Report for Application No. 12150113.4-2224 dated Jul. 5, 2012, 7 pages.

(Continued)

*Primary Examiner* — Isaac M Woo
(74) *Attorney, Agent, or Firm* — Meyertons, Hood, Kivlin, Kowert & Goetzel, P.C.

(57) ABSTRACT

Techniques relating to performing an incremental backup of a database relative to a previous backup are disclosed. The incremental backup may include initiating monitoring of a dirty list indicative of one or more portions of the database that have been modified since the previous backup, causing a reset of the dirty list, obtaining a copy of the dirty list, and backing up only portions of the database identified by the copy of the dirty list. The copy may be representative of the dirty list immediately prior to the reset.

19 Claims, 10 Drawing Sheets

(56) References Cited

U.S. PATENT DOCUMENTS

| | | |
|---|---|---|
| 2008/0263109 A1 | 10/2008 | Patterson |
| 2010/0005259 A1 | 1/2010 | Prahlad et al. |
| 2010/0023716 A1 | 1/2010 | Nemoto et al. |
| 2010/0049930 A1 | 2/2010 | Pershin et al. |
| 2010/0058010 A1 | 3/2010 | Augenstein et al. |
| 2010/0077165 A1 | 3/2010 | Lu et al. |
| 2010/0122324 A1 | 5/2010 | Welingkar et al. |
| 2011/0004586 A1 | 1/2011 | Cherryholmes et al. |
| 2017/0206221 A1* | 7/2017 | Kumarasamy .... G06F 17/30174 |

OTHER PUBLICATIONS

Office Action in U.S. Appl. No. 12/986,666 dated Mar. 8, 2012, 16 pages.
Office Action in U.S. Appl. No. 12/986,666 dated Aug. 22, 2012, 18 pages.
Office Action in U.S. Appl. No. 12/986,666 dated Feb. 28, 2013, 21 pages.

* cited by examiner

INCREMENTAL BACKUP SYSTEM

BACKGROUND

Technical Field

This disclosure relates generally to an incremental backup system.

Description of the Related Art

Database systems contain vast amounts of information generated and used by a variety of software applications. Because of the importance of the information stored in databases, a database system provides mechanisms to backup and restore the databases managed by that system. A backup mechanism may create a complete copy of the database, and the restore mechanism may overwrite the database with the copy. A database system may also be capable of playing back transactions to restore a database. Such a database system may log all transactions and use those transactions to restore a database to a particular state by starting at a known prior state and applying transactions that occurred after that state.

A database system may also provide a mechanism that allows the state of a database to be preserved in a "snapshot." A snapshot is a point-in-time image of a live database. One use of snapshots is to copy a database without disabling access to the database for a long period of time. After performing the snapshot, the database system can then copy the database by using the snapshot. Thus, the database system performs a full backup of the primary database when the primary database is active. Snapshot backups may minimize or eliminate the use of the resources of the database server to accomplish the backup. This may allow the availability of the server to be minimally impacted by performing a backup operation.

Although snapshots may result in reduced downtime of a database when performing a backup, a full backup of the database may still utilize a large amount of storage space. One way to reduce backup storage utilization is to perform a differential backup. In a differential backup, only those parts of the database that have changed since the most recent full backup are saved. The use of a differential backup tends to save storage space because typically, only a small percentage of the data in a database changes between consecutive backups. Differential backups may thus utilize storage space more efficiently as compared to a full backup. However, when several differential backups are run relative to the same full backup, in some cases, each differential backup may include a separate copy of the same file. For example, a copy of a file changed shortly after a full backup of a database will be present in each of multiple successive differential backups of that database. Accordingly, differential backups may exhibit their own storage inefficiencies.

One way to address the inefficiencies of differential backups is to perform an incremental backup. In an incremental backup, only the portions of the database that have changed since the last backup of any type (be it a full, differential, or incremental backup) are copied. Thus, an incremental backup performed after a differential backup will only store those portions of a database that have changed since the differential backup, and thus will not store, for example, files that were changed only prior to the different backup. Unfortunately, not all databases support incremental backups. For example, one type of database system that does not support incremental backups is a Microsoft® structured query language (SQL) server database system (a SQL-based server database system).

SUMMARY

In one embodiment, a non-transitory computer-readable storage medium is disclosed having program instructions stored thereon that, when executed by a processor, cause the processor to carry out operations that include performing an incremental backup of a database relative to a previous backup. The incremental backup may include initiating monitoring of a dirty list indicative of one or more portions of the database that have been modified since the previous backup, causing a reset of the dirty list, obtaining a copy of the dirty list, and backing up only portions of the database identified by the copy of the dirty list. The copy may be representative of the dirty list immediately prior to the reset. In some embodiments, a database manager of the database does not natively support the incremental backup. In some embodiments, causing the reset of the dirty list includes requesting a full backup of the database.

In some embodiments, initiating monitoring the dirty list may include sending, to a filter driver, a request to monitor the dirty list, where obtaining the copy of the dirty list includes receiving the copy of the dirty list from the filter driver. The request to monitor the dirty list may include a request to enable the filter driver. In some embodiments, the operations further include, in response to receiving the copy of the dirty list, sending, to the filter driver, a request to disable the filter driver. In some embodiments, the operations further include sending, to the filter driver after performing the incremental backup, a request for the filter driver to translate a memory request that addresses the database. The database may not be configured to respond to the memory request without translation.

In some embodiments, the operations further include generating a full backup of the database. Generating the full backup of the database may include retrieving a previous full backup of the database and applying one or more incremental backups of the database to the previous full backup. The one or more incremental backups may include the incremental backup.

In one embodiment, a non-transitory computer-readable storage medium is disclosed having program instructions stored thereon that, when executed by a processor, cause the processor to carry out operations that include generating an incremental backup of a database. Generating the incremental backup may include sending, to a filter driver, a request to monitor a dirty block list indicative of one or more particular files of the database that have been modified since a previous backup of the database. Generating the incremental backup may further include sending, to a database manager, a request for a full backup of the database. The full backup may cause a reset of contents of the dirty block list. Generating the incremental backup may further include receiving, from the filter driver, a copy of the dirty block list. The copy may include the contents of the dirty block list immediately prior to the reset. Generating the incremental backup may further include saving, as part of the incremental backup, a copy of the one or more particular files indicated by the copy of the dirty block list.

In some embodiments, the database manager may not natively support an incremental backup operation. The database manager may be a structured query language (SQL) server-based data manager.

In some embodiments, the previous backup is a different incremental backup of the database. In some embodiments, the previous backup is a full backup of the database.

In some embodiments, the filter driver is configured to generate the copy of the dirty block list in response to the request to monitor the dirty block list by detecting a reset indication that corresponds to the reset of the contents of the dirty block list, and in response to the reset indication and prior to the reset, copying the contents of the dirty block list. The reset indication may include a write request that addresses a memory location corresponding to the dirty block list. The reset indication may further include a reset dirty block list that indicates that no files of the database have been modified.

In some embodiments, the filter driver is configured to generate the copy of the dirty block list in response to the request to monitor the dirty block list. Generating the copy may include, prior to the reset of the contents of the dirty block list, saving a copy of the dirty block list as a duplicate dirty block list. Generating the copy may further include, in response to the reset, indicating the duplicate dirty block list as the copy of the dirty block list. In some embodiments, prior to the reset and after saving the copy of the dirty block list as the duplicate dirty block list, the filter driver receives an indication of an update to at least a portion of the contents of the dirty block list. The filter driver may perform an update to the duplicate dirty block list that corresponds to the update to the dirty block list.

In one embodiment, a method includes receiving, at a filter driver from an incremental backup manager, a request to monitor a dirty list indicative of one or more pages of a database that have been modified since a previous backup of the database. The method further includes saving, by the filter driver, a copy of the dirty list immediately prior to the dirty list being reset, and in response to the dirty list being reset, sending, by the filter driver, the copy of the dirty list to the incremental backup manager.

In some embodiments, saving the copy of the dirty list is performed in response to detecting a freeze operation that addresses the database. The freeze operation may be indicative of a reset operation that addresses the dirty list.

In some embodiments, saving the copy of the dirty list includes, in response to the request to monitor the dirty list, generating a duplicate dirty list. Saving the copy of the dirty list may further include detecting an update to the dirty list indicative of one or more additional pages of the database have been modified. Saving the copy of the dirty list may further include performing an update to the duplicate dirty list that corresponds to the update to the dirty list, and detecting the dirty list being reset. The duplicate dirty list when the dirty list is reset may be the copy of the dirty list immediately prior to the dirty list being reset.

In some embodiments, the filter driver may be active only after receiving the request to monitor the dirty list and until the sending the copy of the dirty list.

These and other features and advantages will become apparent to those of ordinary skill in the art in view of the following detailed descriptions of the approaches presented herein.

Figure 1:
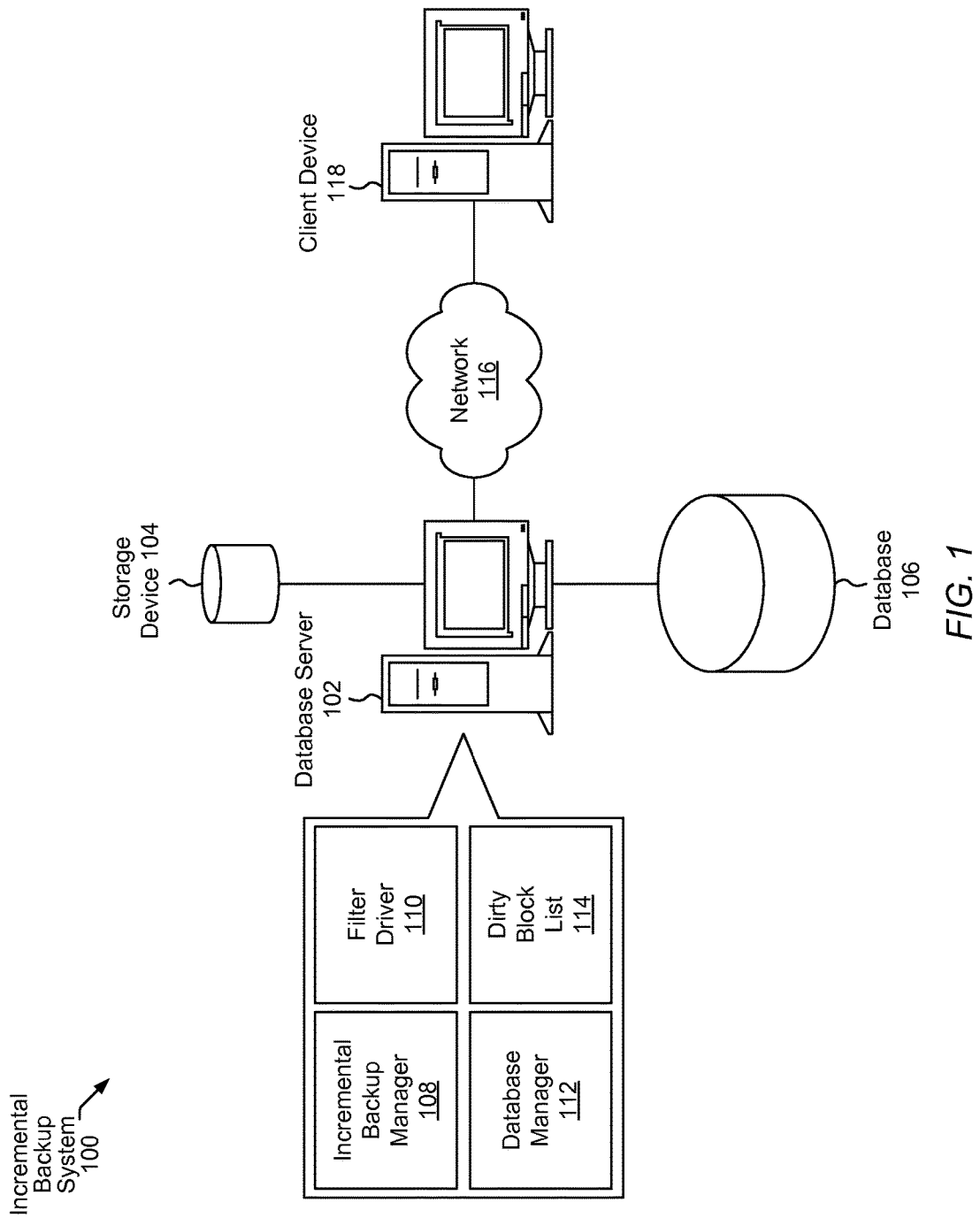
FIG. 1 is a block diagram that illustrates an incremental backup system in accordance with one or more embodiments.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. As one example, although the following description may refer to a single processor, it is contemplated that the operation may function using one or more processing units. It will be appreciated that for simplicity and clarity of illustration, elements shown in the figures have not necessarily been drawn to scale. For example, the dimensions of some of the elements may be exaggerated relative to other elements.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising one or more storage devices . . . ." Such a claim does not foreclose the system from including additional components (e.g., a display device, a processing device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions that, when executed by a processor, cause the processor to carry out the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a database having eight portions, the terms "first portion" and "second portion" can be used to refer to any two of the eight portions. In other words, the "first" and "second" portions are not limited to logical portions 0 and 1.

"Based On." As used herein, this term is used to describe one or more factors that affect a determination or effect. This term does not foreclose additional factors that may affect a determination or effect. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"In Response To." As used herein, this term is used to describe one or more factors that trigger an effect. This phrase does not foreclose additional factors that may affect or otherwise trigger the effect. That is, an effect may be solely in response to those factors, or may be in response to those factors as well as in response to other factors. Consider the phrase "perform A in response to B." While in this case, B is a factor that triggers the performance of A, such a phrase does not foreclose the performance of A from also being in response to C. In other instances, A may be performed solely in response to B.

DETAILED DESCRIPTION

As described above, one way to generate a backup that may have a smaller size than a full backup is to perform an incremental backup of a database, where only the portions of the database that have changed since a most recent backup (e.g., incremental, full, differential, etc.) are copied. One way to perform an incremental backup is to watch a drive that includes the database and track which portions of the drive have changed. However such an implementation may require an undesirable amount of computing resources or may be undesirably slow. Some database managers, such as a database manager of a system running Microsoft® structured query language (SQL) server (a SQL server-based database manager), may include a dirty block list. The dirty block list is a list of which (if any) portions of the database that have been modified since a prior point in time, such as a time of a full backup. Accordingly, the dirty block list may simplify a determination of which portions of the database have changed (and thus should be copied as part of an incremental backup). However, as mentioned previously, SQL server and other similar database systems currently do not natively support incremental backups.

As used herein, "natively support" has its ordinary and accepted meaning in the art, which describes a feature that is provided by a program, programming environment, or product without needing additional program support (e.g., additional code, an extension, or a third party product).

In some cases, backup requests (e.g., differential backup requests) do not result in the database manager clearing the dirty block list. However, if a backup is performed and the dirty block list is not cleared, in some cases, during a subsequent incremental backup that utilizes the dirty block list, additional processing may be performed to determine which portions of the database were previously backed up. For example, a time stamp of a modification to a particular portion of the database may be compared to a time of a previous backup to determine whether the previous backup includes the modification to the particular portion of the database. Accordingly, backup requests that do not result in the database manager clearing the dirty block list may result in additional processing during subsequent backup operations.

In some embodiments, a request to perform a full backup causes the database manager to freeze operation of the database and then reset the dirty block list as part of a single operation (e.g., complicating access to the contents of the dirty block list as it existed immediately prior to the reset). As will be discussed further below, in some embodiments, a system may be configured to perform an incremental backup of a database by calling a filter driver that creates a copy of the dirty block list immediately prior to the reset. Accordingly, the system described herein may generate incremental backups of a database using resources of a database manager that does not natively support incremental backups. Generating incremental backups using the resources of the database manager may use less computing resources and may be faster, as compared to generating incremental backups of a database managed by a database manager that does not support incremental backups. Additionally, generating incremental backups using the resources of the database manager may enable the incremental backup system to more easily track backups on multiple nodes of a database, which may be tracked and backed up separately in a system that generates incremental backups without using the resources of the database manager. Accordingly, the techniques described herein may be particularly useful for systems that include a database manager that does not natively support incremental backups, such as database systems running SQL server.

As used herein, "immediately prior to" refers to a time span between a most recent update of one or more data objects and an event. This phrase does not necessarily refer to a fixed amount of time. Accordingly, if a data object is modified and then deleted one day later without further modification, a version of the data object "immediately prior to" the deletion may be acquired at any point during that one day. Further, if an entity such as a dirty block list as described below is reset, saving a copy of the dirty block list immediately prior to the reset would include obtaining the contents of the dirty block list just before it was reset or at another point in time before the dirty block list was reset but after a final modification of the dirty block list.

This disclosure initially describes, with reference to FIG. 1, an embodiment of an incremental backup system. An embodiment of the incremental backup system generating an incremental backup is then described with reference to FIG. 2. Next, an embodiment of a dirty block list of the incremental backup system is described with reference to FIG. 3. Different manners of performing the incremental backup are described with reference to FIGS. 4 and 5. An embodiment of the incremental backup system generating a synthetic full backup is then described with reference to FIG. 6. An exemplary computing system configured to implement at least a portion of an incremental backup system is described with reference to FIG. 7. A method of performing an incremental backup is described with reference to FIG. 8. A method performed by a filter driver as part of an incremental backup is described with reference to FIG. 9. Finally, a computer accessible storage medium including instructions that, when executed by a processor, cause the processor to implement at least a portion of an incremental backup system is described with reference to FIG. 10.

Turning now to FIG. 1, a block diagram of one embodiment of an exemplary incremental backup system 100 is shown. The incremental backup system 100 includes a database server 102 connected to a storage device 104 and a database 106. The database server 102 is also connected to a client device 118 via a network 116. In another embodiment, the database server 102 is connected to one or more devices (e.g., the storage device 104 or the database 106) via another computing device (e.g., a media server configured to manage the storage device 104) and/or a network (such as the network 116). In another embodiment, some processes, applications, or data illustrated as being hosted by the database server 102 (e.g., an incremental backup manager 108) may instead be hosted by one or more other devices (e.g., the client device 118).

Database 106 may represent one or more storage devices, a database program, one or more actual databases (e.g., several nodes or computing devices) implemented therein, or any combination thereof. The database program refers to the executable commands, user interfaces and other program code for operating the database. The included databases may further comprise various tables, indexes, relationships, queries, stored procedures, file systems, security layers, networking interfaces, etc., which are configured to operate on a plurality of data records. The database 106 may be divided into portions (e.g., 64 kilobyte (kB) pages of data). Although FIG. 1 illustrates the database 106 as being separate from, for example, the database server 102, in other embodiments, the database 106 may execute on or may be otherwise integrated into the database server 102 or another computing device (e.g., the client device 118).

Database server 102 includes the incremental backup manager 108, a filter driver 110, a database manager 112, and a dirty block list (or dirty list) 114, that, together, facilitate access to or otherwise manage the database 106, the storage device 104, or both. The database server 102 (using the database manager 112) may not natively support an incremental backup operation. For example, in some embodiments, the database manager 112 is a Microsoft® structured query language (SQL) server-based database manager that stores and retrieves information from the database 106 in response to requests (e.g., from the incremental backup manager 108 or from the client device 118). Additionally, as described further with reference to FIG. 3, the database manager 112 may maintain the dirty block list 114, which, in the illustrated embodiment, indicates whether the portions of the database 106 have been modified since the database manager 112 most recently received a full backup request.

The incremental backup manager 108, as further described below with reference to FIG. 2, may, in response to a request for an incremental backup (e.g., from the client device 118) send requests to the database manager 112, the filter driver 110, the database 106, the storage device 104, or any combination thereof. In response to the requests, the dirty block list 114 may be reset (e.g., changed to a state where the dirty block list 114 indicates that no portions of the database 106 have been modified or changed to a state where the dirty block list 114 indicates that only specific, fixed portions of the database 106 have been modified) by the database manager 112. Additionally, in response to the requests, the incremental backup manager 108 may obtain, from the filter driver 110, a copy of the dirty block list 114 immediately prior to the reset. Accordingly, as described further below, the filter driver 110 may copy the contents of the dirty block list 114 just before the dirty block list 114 was reset or at another point in time before the dirty block list was reset but after a final modification of the dirty block list 114. The incremental backup manager 108 may cause portions of the database 106 indicated by the copy of the dirty block list 114 immediately prior to the reset to be backed up at a storage device, such as the storage device 104. In the illustrated embodiment, the filter driver 110 is active only during an incremental backup request from the incremental backup manager 108 (the filter driver 110 is awakened in response to an incremental backup request and is disabled during the processing of or subsequent to the incremental backup request). In other embodiments, the filter driver 110 may perform other actions, such as translating memory requests (e.g., read or write requests) that address one or more storage devices that include the database 106.

As described herein, "obtaining" is a broad term that includes receiving an object. Additionally, "obtaining" includes receiving a way to retrieve an object. For example, the incremental backup manager 108 can "obtain" the copy of the dirty block list 114 immediately prior to the reset by receiving the copy of the dirty block list 114. Alternatively, the incremental backup manager 108 can "obtain" the copy of the dirty block list 114 immediately prior to the reset by receiving a method of retrieving copy of the dirty block list 114, such as a pointer to a location where the copy of the dirty block list 114 is stored.

Storage device 104 may store one or more backups of one or more databases (e.g., the database 106 and another database). Storage device 104 may be representative of any number of storage devices, and may comprise any of a variety of types of storage media, such as a hard disk drive, disk volume, server blade, flash drive, optical drive, tape drive, tape volume, robotic tape library, or other storage medium. In some embodiments, the storage device 104 may include the database 106 (e.g., the database 106 and the backup may occupy different portions of the storage device 104). The storage device 104 may be included in the database server 102, the client device 118, or another computing device.

Network 116 may include a variety of network connections including combinations of local area networks (LANs), such as Ethernet networks and Fibre Channel (FC) networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks such as a virtual private network (VPN) implemented over a public network (e.g., the Internet). Other network connections and architectures are possible and contemplated.

Client device 118 may include one or more user interfaces and may facilitate communication between a user or system administrator and the database server 102 via the network 116. For example, the client device 118 may send one or more requests to the database server 102 for data stored at the database 106. In some cases, the user may wish to create a backup of the database 106. On behalf of the user, the client device 118 may send one or more requests to the database server 102 to request that the incremental backup manager 108 create a backup of the database 106 at the storage device 104. In some embodiments, the client device 118 may interact directly with the incremental backup manager 108 (e.g., through an application programming interface (API) of the incremental backup manager). In other embodiments, the client device 118 may interact with another portion of the database server 102 to request the backup. The client device 118 may request a specific kind of backup or may be unaware of what type of backup (e.g., full, incremental, or differential) is created.

In some embodiments, the incremental backup system 100 can generate an incremental backup of the database 106 using the dirty block list 114 of the database manager 112, even though the database manager 112 does not natively support an incremental backup operation. In some embodiments, incremental backup system 100 generates a backup that is more space efficient than a full backup or a differential backup. Additionally, because the incremental backup system 100 utilizes the dirty block list 114, the incremental backup system 100 may generate a backup of the database 106 more quickly and utilizing fewer computing resources, as compared to a system that backs up a database by watching a drive that includes the database 106. Further, in some cases, generating incremental backups using the dirty block list 114 may enable the incremental backup system 100 to more easily track backups on multiple nodes of the database 106, which may be tracked and backed up separately in a system that generates incremental backups of the database 106 without using the dirty block list 114.

Figure 2:
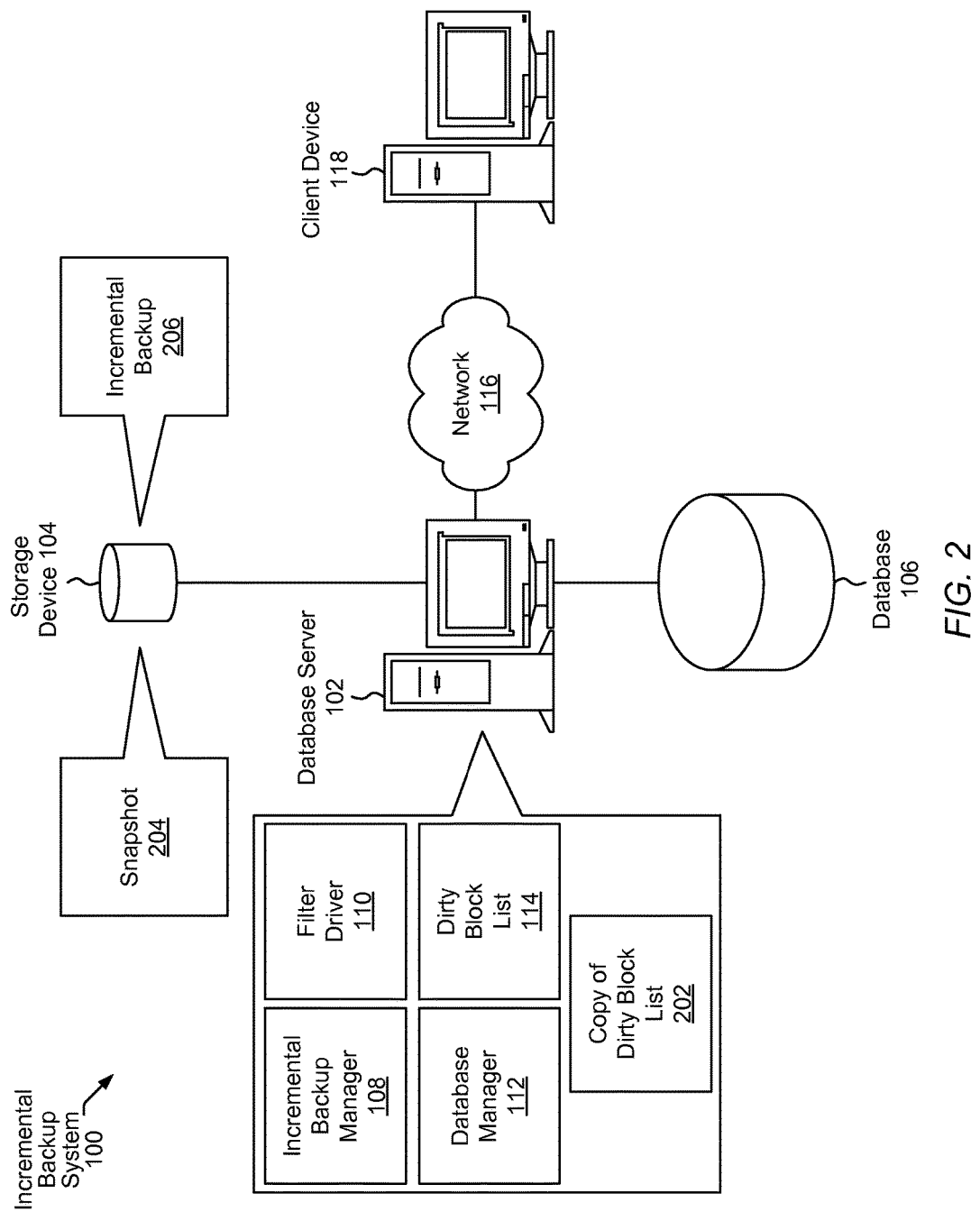
FIG. 2 is a block diagram that illustrates embodiments of the incremental backup system creating an incremental backup.

Turning now to FIG. 2, a block diagram of one embodiment of the incremental backup system 100 creating an incremental backup is shown. In the illustrated embodiment, the database server 102 additionally includes a copy of a dirty block list 202. Further, the storage device 104 includes a snapshot 204 and an incremental backup 206. However, in another embodiment, the copy of the dirty block list 202 may be saved at one or more other storage devices (e.g., the storage device 104, the client device 118, etc.). Similarly, the snapshot 204, the incremental backup 206, or both may also be stored at one or more other storage devices.

As discussed above, the incremental backup manager 108 of the database server 102 may receive a request for a backup of the database 106. In response to the request, the incremental backup manager 108 may send a request to the filter driver 110 to monitor the dirty block list 114. Additionally, in response to the request, the incremental backup manager 108 may send a request for a full backup to the database manager 112 (thus tricking the database manager 112), which, as discussed above, may not natively support an incremental backup operation.

As further discussed below with reference to FIGS. 4, 5, and 9, in response to the request to monitor the dirty block list 114, the filter driver 110 may save contents of the dirty block list 114 to a copy of the dirty block list 202 immediately before the dirty block list 114 is reset. Accordingly, the filter driver 110 may preserve the contents of the dirty block list 114 at the copy of the dirty block list 202. In response to the dirty block list 114 being reset, the filter driver 110 may send the copy of the dirty block list 202 to the incremental backup manager 108.

In response to the request for a full backup, the database manager 112 may generate the snapshot 204 of the database 106 and may reset the dirty block list 114. Generating the snapshot 204 may include performing a freeze operation (e.g., delay or otherwise prevent modifications to the database 106 for a particular period of time) to generate the snapshot 204 of the database 106. The snapshot 204 may backup the database 106 as the database 106 existed during the freeze operation. In the illustrated embodiment, the snapshot 204 is saved at the storage device 104. Resetting the dirty block list 114 may include modifying the dirty block list 114 such that the dirty block list 114 indicates that none of the database 106 has been modified since a most recent backup. Alternatively, resetting the dirty block list 114 may include modifying the dirty block list 114 such that the dirty block list 114 indicates that particular, defined portions of the database 106 (e.g., system blocks or header portions) have been modified since a most recent backup, as described further below, with reference to FIG. 3. In some embodiments, modifying the dirty block list 114 may include overwriting the entire dirty block list 114 (e.g., with one or more write operations). In other embodiments, modifying the dirty block list 114 may include overwriting portions of the dirty block list 114 (e.g., writing individual bits to corresponding portions of the dirty block list 114). Resetting the dirty block list 114 may be performed without providing an opportunity for the incremental backup manager 108 to request the contents of the dirty block list 114.

In response to the dirty block list 114 being reset and to receiving the copy of the dirty block list 202 from the filter driver 110, the incremental backup manager 108 may determine, based on the copy of the dirty block list 202, portions of the snapshot 204 that should be saved as the incremental backup 206. Accordingly, in some embodiments, the incremental backup manager 108 may backup only portions of the database 106 identified by the copy of the dirty block list 202 as having been modified since a previous backup of the database 106. Thus, the incremental backup manager 108 may generate the incremental backup 206 using the dirty block list 114 of the database manager 112, even though the database manager 112 may not natively support an incremental backup operation.

In some embodiments, the incremental backup system 100 may generate the incremental backup 206 based on one or more writes to the database 106. For example, in some cases, the filter driver 110 may copy contents of the dirty block list 114 into the copy of the dirty block list 202. After copying the contents, the filter driver 110 may monitor the database 106 (or a file that includes the database 106) to determine whether one or more portions of the database 106 that are not indicated as being modified by the copy of the dirty block list 202 are subsequently modified. In response to detecting a modification to a portion of the database 106 which is not indicated as being modified by the copy of the dirty block list 202, the filter driver 110 may update the copy of the dirty block list 202 to indicate the modification. Alternatively, the filter driver 110 may note the modification in another file. In some embodiments, the filter driver 110 monitors the database 106 (or a file that includes the database 106) until after a thaw corresponding to the snapshot 204. Accordingly, in a particular embodiment, the incremental backup 206 includes the portions of the database 106 indicated by the dirty block list 114 and further includes data modified at the database 106 by one or more write operations performed between the generation of the copy of the dirty block list 202 and the thaw associated with the snapshot 204.

In some cases, the contents of the copy of the dirty block list 202 may differ (e.g., may indicate additional portions of the database 106 are "dirty") from the contents of the dirty block list 114 immediately prior to the reset. For example, in some cases, the database 106 may be modified after a freeze operation at the database 106 but prior to a thaw operation at the database 106. The contents of the dirty block list 114 may not identify the modification to the database 106, but because the filter driver 110 monitored the database 106, the copy of the dirty block list 202 may identify the modification to the database 106. In other embodiments, the database 106 may be monitored by other portions of the incremental backup system 100 (e.g., the incremental backup manager 108).

In some embodiments, a method includes a filter driver receiving (e.g., from an incremental backup manager) a request for information indicative of one or more portions of a database that have been modified since a previous backup of the database. The method may further include, in response to the request, the filter driver saving a copy of a dirty block list indicative of one or more portions of the database that have been modified since the previous backup of the database. The method may further include the filter driver monitoring for any further modifications to the database. The method may further include, in response to detecting a thaw operation corresponding to the database, the filter driver outputting (e.g., to the incremental backup manager) information indicating the portions of the database that have been modified since the previous backup.

In one embodiment, the information output by the filter driver may be the information of the dirty block list. In another embodiment, this information may encompass the dirty block list plus another data structure (e.g., a separate file that identifies modifications to the database not identified by the dirty block list). In yet another embodiment, this information may reflect the information of the dirty block list, as updated based on modifications to the database not identified by the dirty block list.

In some embodiments, the copy of the dirty block list is saved immediately prior to the dirty block list being reset. In other embodiments, the copy of the dirty block list is not saved immediately prior to the dirty block list being reset. For example, in a particular embodiment, the request may be received one day before the dirty block list is reset. In the particular embodiment, the copy of the dirty block list is generated using the dirty block list immediately in response to the request. In the particular embodiment, subsequent modifications to the database during the day are detected by the filter driver such that updates to the copy of the dirty block list are performed independently of the dirty block list.

Accordingly, as noted above, the incremental backup system 100 may generate the incremental backup 206 of the database 106 such that it is more space efficient than a full backup or a differential backup. Additionally, because the incremental backup system 100 utilizes the dirty block list 114, the incremental backup system 100 may generate the incremental backup 206 more quickly and utilizing fewer computing resources, as compared to a system that backs up a database by watching a drive that includes the database 106. Further, in some cases, generating the incremental backup 206 using the dirty block list 114 may enable the incremental backup system 100 to more easily track backups on multiple nodes of the database 106, which may be tracked and backed up separately in a system that generates incremental backups of the database 106 without using the dirty block list 114.

Figure 3:
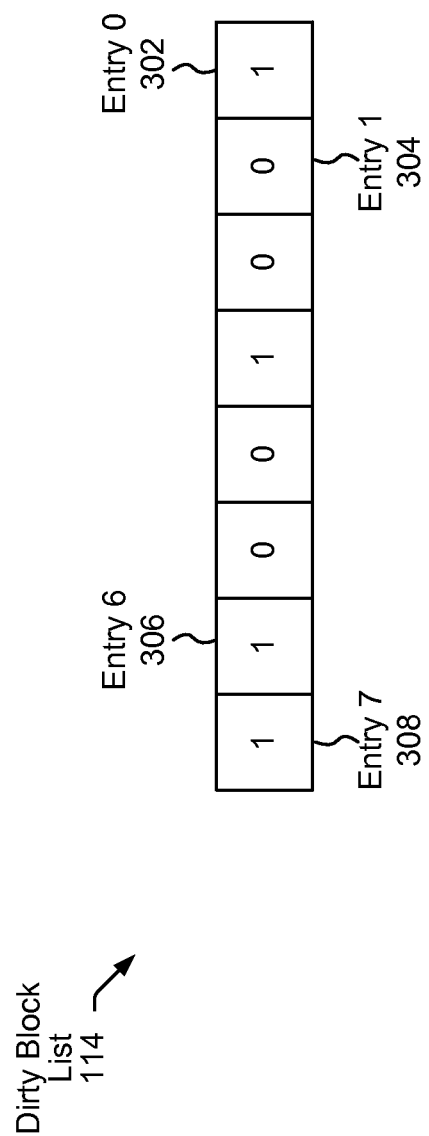
FIG. 3 is a block diagram that illustrates an exemplary dirty block list in accordance with one or more embodiments.

Turning now to FIG. 3, a block diagram of one exemplary embodiment of the dirty block list 114 is shown. As discussed above, respective entries of the dirty block list 114 indicate whether corresponding portions of the database 106 have been modified since a previous reference point in time (e.g., a previous full backup). In the illustrated embodiment, the dirty block list 114 includes eight entries, including entry 0 302, entry 1 304, entry 6 306, and entry 7 308, that refer to eight respective portions of the database 106. However, in other embodiments, the dirty block list 114 includes more entries (e.g., 65536 one bit entries, or 8 kB of entries). In the illustrated embodiment, when an entry (e.g., entry 0 302) stores a logical "1", a corresponding portion of the database 106 has been modified since a previous backup operation. However, in other embodiments, other schemes may be used (e.g., a logical "0" indicates a modified portion of the database 106). In general, the contents dirty block list 114 may be encoded in any suitable manner that indicates which portions of database 106 have been modified since a previous reference point in time (e.g., a previous full backup).

In response to a write operation being performed at the database, the database manager 112 may perform a corresponding write operation at the dirty block list 114. In some embodiments, the corresponding write operation involves modifying a single bit of the dirty block list 114 (e.g., changing the logical "0" of entry 1 304 to a logical "1"). In other embodiments, the corresponding write operation involves overwriting the entire dirty block list 114 (e.g., writing "11001011" over the dirty block list 114 to change the logical "0" of entry 1 304 to a logical "1").

As discussed above, in response to a request to perform a full backup from the incremental backup manager 108, the database manager 112 may reset the dirty block list 114. In some embodiments, resetting the dirty block list 114 includes the database manager 112 performing a full reset. As used herein, a "full reset" describes overwriting the dirty block list 114 or portions of the dirty block list 114 such that the dirty block list 114 indicates that none of the database 106 has been modified since a previous backup operation. For example, the database manager 112 may perform a full reset of the dirty block list 114 illustrated in FIG. 3 by writing a logical "00000000" at the dirty block list 114. Alternatively, the database manager 112 may perform a full reset of the dirty block list 114 by only writing a logical "0" over each logical "1" value at the dirty block list 114. For example, the database manager 112 may perform a full reset of the dirty block list 114 illustrated in FIG. 3 by writing logical "0" values at entry 0 302, entry 3, entry 6 306, and entry 7 308.

In other embodiments, certain portions (e.g., corresponding to system blocks or file headers) of the database 106 may be indicated as always being dirty by the dirty block list 114 for various reasons such as ensuring that particular file headers are included in every backup. Accordingly, in some embodiments, the database manager 112 is configured to reset the dirty block list 114 by performing a partial reset. As used herein, a "partial reset" describes overwriting the dirty block list 114 or portions of the dirty block list 114 such that the dirty block list 114 always indicates that particular portions of the database 106 have been modified. For example, the database manager 112 may perform a partial reset of the dirty block list 114 illustrated in FIG. 3 by writing a logical "11000000" at the dirty block list 114, where entry 6 306 and entry 7 308 correspond to portions of the database 106 that the dirty block list 114 always indicates have been modified. Alternatively, the database manager 112 may perform a partial reset of the dirty block list 114 by only writing a logical "0" over certain logical "1" values at the dirty block list 114. For example, the database manager 112 may perform a partial reset of the dirty block list 114 illustrated in FIG. 3 by writing logical "0" values at entry 0 302 and entry 3, where entry 6 306 and entry 7 308 correspond to portions of the database 106 that the dirty block list 114 always indicates have been modified.

As noted above, the entries (the bits) of the dirty block list 114 correspond to respective portions of the database 106. However, in other embodiments, the dirty block list 114 refers to a larger storage entity that includes the database 106. Accordingly, in some embodiments, a portion of the entries of the dirty block list 114 refer to the database 106, but other entries of the dirty block list 114 do not refer to the database 106. Additionally, in some cases, based on a number of portions the database 106 referred to by the dirty block list 114, the dirty block list 114 may include several files. For example, in a particular embodiment, the dirty block list 114 is stored on one or more 64 kilobyte (kB) pages and the entries of the dirty block list 114 each refer to a respective pages. Accordingly, in the particular embodiment, if the database 106 exceeds a particular size (e.g., 4 terabytes (TB)), the dirty block list 114 may include so many entries that the dirty block list 114 is stored on several pages. As a result, in the particular embodiment, when the dirty block list 114 is reset, several write operations are performed (e.g., at least one write for each page).

Figure 4:
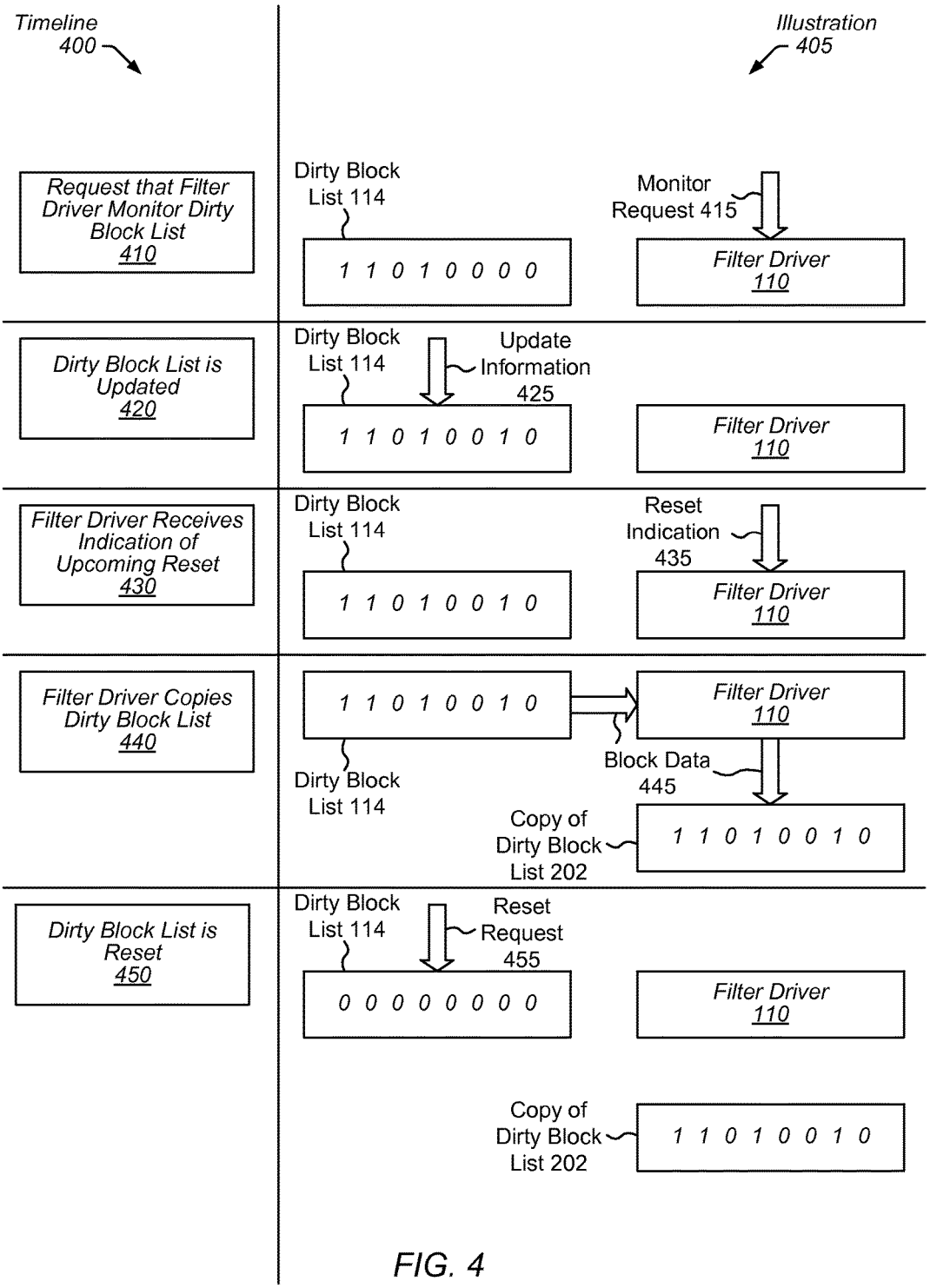
FIG. 4 illustrates a timeline and corresponding illustration of a first dirty block list copy process in accordance with one or more embodiments.

Turning now to FIG. 4, an embodiment of a first dirty block list copy process illustrated with reference to timeline 400 and corresponding illustration 405. Portions of the timeline 400 may describe corresponding portions of the illustration 405. In some embodiments, the timeline 400 may be initiated or performed by one or more processors in response to one or more instructions stored by a computer-readable storage medium. For purposes of discussion, the elements of this embodiment are shown in sequential order. It should be noted that in various embodiments of the timeline 400, one or more of the elements described may be performed concurrently, in a different order than shown, or may be omitted entirely. Other additional elements may also be performed as desired.

At 410, filter driver 110 receives monitor request 415 to monitor a dirty block list. Monitor request 415 indicates that the filter driver 110 should monitor the dirty block list 114. The monitor request 415 may be received from the incremental backup manager 108.

At 420, update information 425 is provided to the dirty block list 114, changing entry 1 of the dirty block list 114 from a logical "0" to a logical "1". In the illustrated embodiment, the filter driver 110 is unaffected by the update information 425. The update information 425 may be received from the database manager 112. Alternatively, the update information 425 may be received from the filter driver 110 (e.g., the filter driver 110 is intercepting write requests that address the dirty block list 114 because the filter driver 110 is looking for a reset indication).

At 430, the filter driver 110 receives a reset indication 435 that indicates that the dirty block list 114 will be reset. As further described herein, in some cases, the reset indication 435 may be a freeze operation that addresses the database 106 or a write operation that addresses the dirty block list 114. The reset indication 435 may be received from the database manager 112 or from the database 106.

At 440, the filter driver 110 receives block data 445 (e.g., contents of the dirty block list 114) from the dirty block list 114 and transfers the block data 445 to the copy of the dirty block list 202. Accordingly, the copy of the dirty block list 202 may mirror the dirty block list 114.

At 450, after the block data 445 is transferred, the reset request 455 is received at the dirty block list 114. In the illustrated embodiment, in response to the reset request 455, the dirty block list 114 is reset to a value ("00000000") that indicates that none of the database 106 has been modified since a previous backup operation response to the dirty block list 114. As discussed above, in some embodiments, immediately after the reset operation, the dirty block list 114 may indicate that portions of the database 106 have been modified. In some embodiments, the reset request 455 is received at the dirty block list 114 from the filter driver 110 (e.g., the reset request 455 was included in the reset indication 435 and held at the filter driver 110 until the block data 445 could be copied to the copy of the dirty block list). In other embodiments, the reset request is received at the dirty block list 114 from the database manager 112. In some embodiments, the reset request 455 may be provided to the dirty block list 114 prior to the block data 445 being provided to the copy of the dirty block list 202. In a particular embodiment, the reset request 455 may not change the dirty block list 114 (because the dirty block list 114 already did not indicate that any of the database 106 has been modified since a previous backup). Accordingly, as illustrated by FIG. 4, the filter driver 110 and the copy of the dirty block list 202 may preserve the contents of the dirty block list 114 immediately prior to the reset operation.

Figure 5:
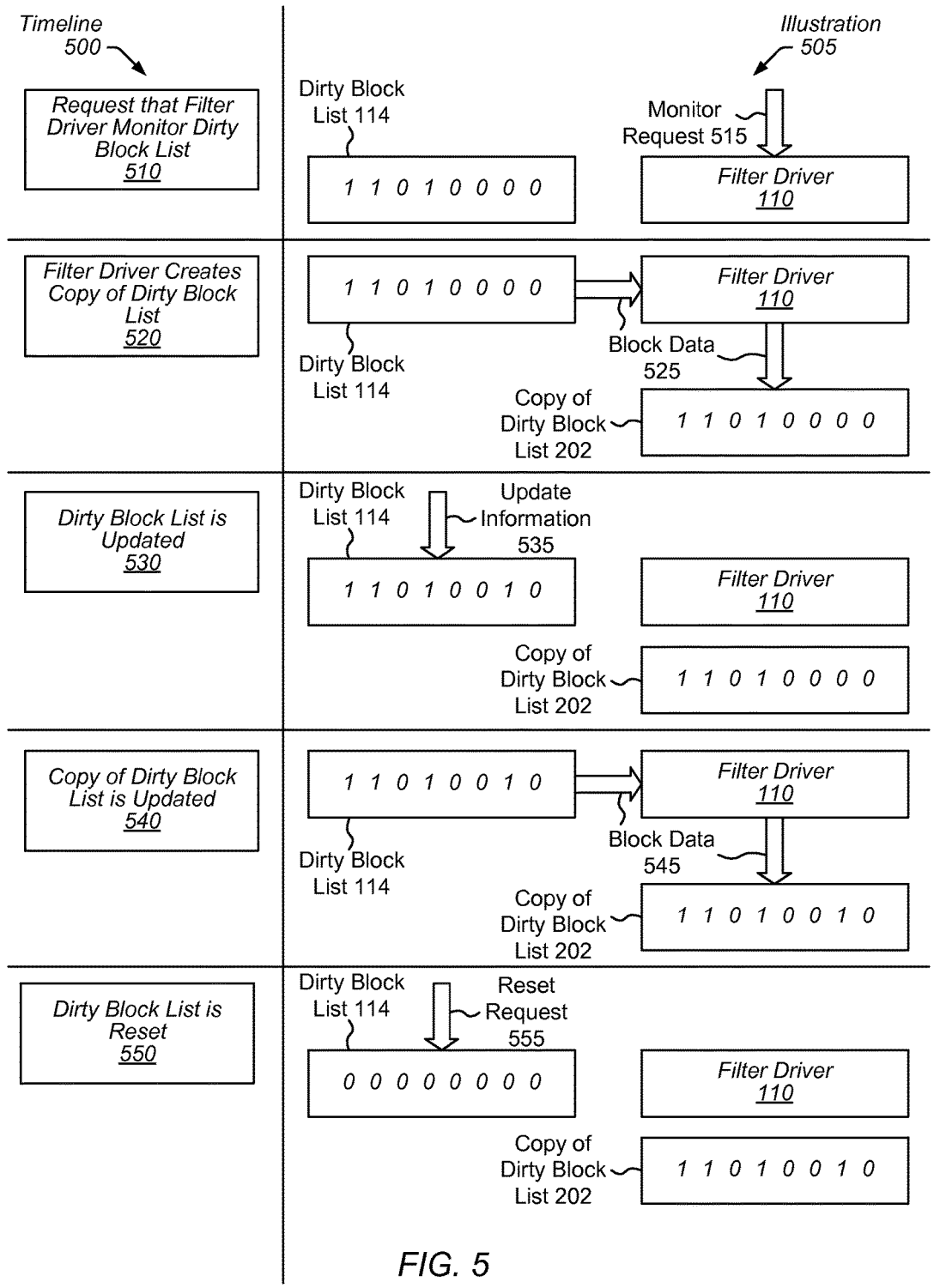
FIG. 5 illustrates a timeline and corresponding illustration of a second dirty block list copy process in accordance with one or more embodiments.

Referring now to FIG. 5, an embodiment of a second dirty block list copy process illustrated with reference to timeline 500 and corresponding illustration 505. Portions of the timeline 500 may describe corresponding portions of the illustration 505. In some embodiments, the timeline 500 may be initiated or performed by one or more processors in response to one or more instructions stored by a computer-readable storage medium. For purposes of discussion, the elements of this embodiment are shown in sequential order. It should be noted that in various embodiments of the timeline 500, one or more of the elements described may be performed concurrently, in a different order than shown, or may be omitted entirely. Other additional elements may also be performed as desired.

At 510, the filter driver 110 receives a monitor request 515 that requests that the filter driver 110 monitor the dirty block list 114. In some embodiments, the monitor request 515 may be received from the incremental backup manager 108.

At 520, in response to the monitor request 515, the filter driver 110 receives block data 525 (e.g., contents of the dirty block list 114) from the dirty block list 114 and transfers the block data 525 to the copy of the dirty block list 202. Accordingly, the copy of the dirty block list 202 may mirror the dirty block list 114.

At 530, update information 535 is provided to the dirty block list 114, changing entry 1 of the dirty block list 114 from a logical "0" to a logical "1". The update information 535 may be received from the database manager 112. Alternatively, the update information 535 may be received from the filter driver 110 (e.g., the filter driver 110 is intercepting write requests that address the dirty block list 114 because the filter driver 110 is looking for a reset indication).

At 540, the filter driver 110 receives block data 545 (e.g., one or more bits of the dirty block list 114) from the dirty block list 114 and transfers the block data 545 to the copy of the dirty block list 202. Accordingly, the copy of the dirty block list 202 may mirror the dirty block list 114. In another embodiment, the copy of the dirty block list 202 may be updated prior to the dirty block list 114 receiving the update information 535 (e.g., because the filter driver 110 is intercepting write requests that address the dirty block list 114). In such an embodiment, the block data 545 may not be received at the filter driver 110 from the dirty block list 114.

At 550, after the block data 545 is transferred, the reset request 555 is received at the dirty block list 114. In the illustrated embodiment, in response to the reset request 555, the dirty block list 114 is reset to a value ("00000000") that indicates that none of the database 106 has been modified since a previous backup operation response to the dirty block list 114. As discussed above, in some embodiments, immediately after the reset operation, the dirty block list 114 may indicate that portions of the database 106 have been modified. In some embodiments, the reset request 555 is received at the dirty block list 114 from the filter driver 110 (e.g., the reset request 555 was included update information that was intercepted by the filter driver 110 prior to being provided to the dirty block list 114). In other embodiments, the reset request is received at the dirty block list 114 from the database manager 112. In some embodiments, the reset request 555 may be provided to the dirty block list 114 prior to the block data 545 being provided to the copy of the dirty block list 202. In a particular embodiment, the reset request 555 may not change the dirty block list 114 (because the dirty block list 114 already did not indicate that any of the database 106 has been modified since a previous backup). Accordingly, as illustrated by FIG. 5, the filter driver 110 and the copy of the dirty block list 202 may preserve the contents of the dirty block list 114 immediately prior to the reset operation.

Figure 6:
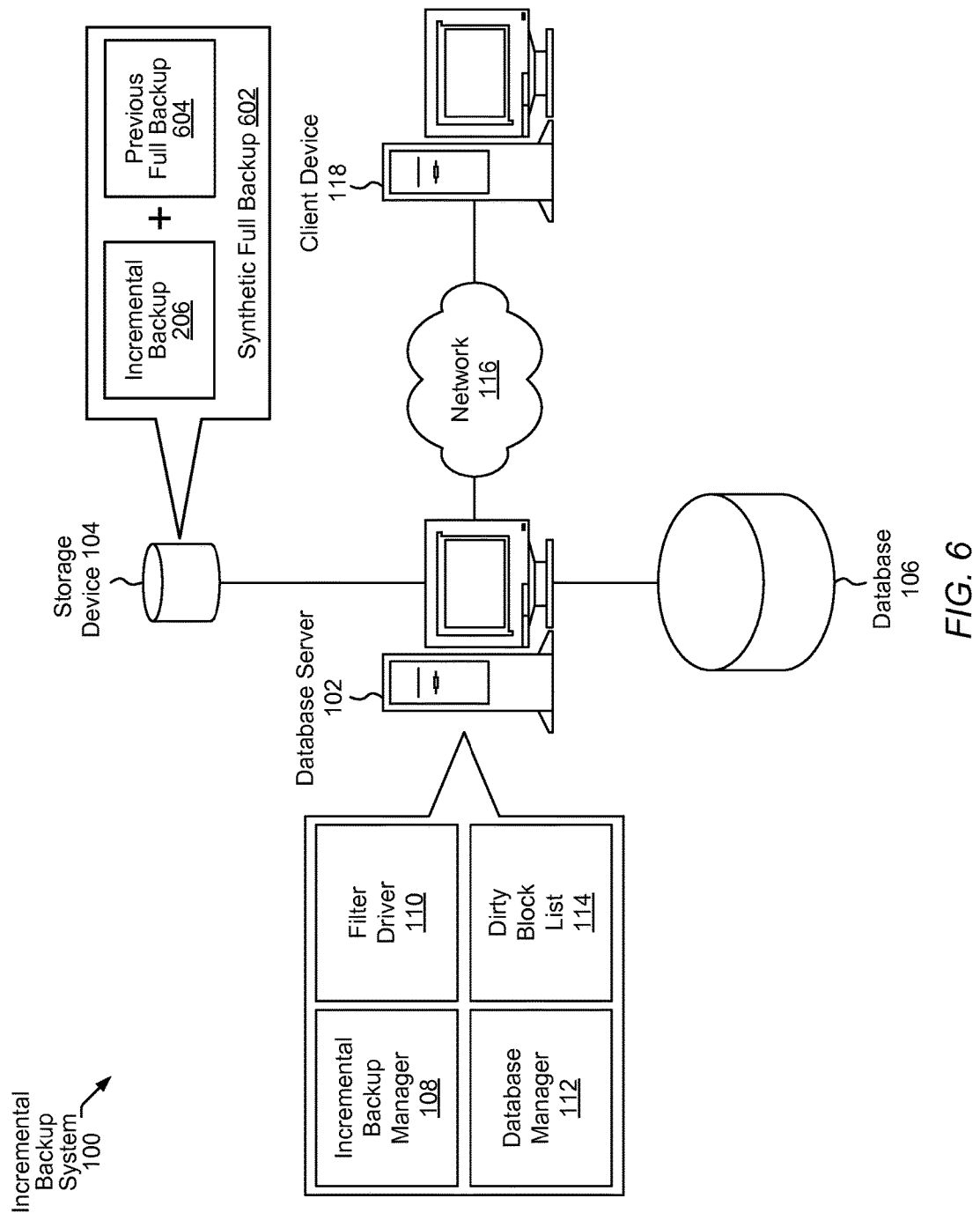
FIG. 6 is a block diagram that illustrates embodiments of the incremental backup system creating a synthetic full backup.

Turning now to FIG. 6, a block diagram of one embodiment of the incremental backup system 100 creating a synthetic full backup is shown. In the illustrated embodiment, the storage device 104 includes a full backup 604 that corresponds to the incremental backup 206. In other words, in the illustrated embodiment, the incremental backup 206 is relative to the full backup 604. In other embodiments, the incremental backup 206 is additionally relative to one or more other incremental backups (not shown) which are also relative to the full backup 604. Additionally, the storage device 104 may further store one or more other full backups and/or incremental backups corresponding to the database 106 at different points in time.

A user or administrator (e.g., associated with the client device 118) may request to restore the database 106 to a specific point in time associated with the incremental backup 206. As previously described, in the illustrated embodiment, storage device 104 stores backups of database 106, including the incremental backup 206 and the full backup 604. In this example, the full backup 604 corresponds to a most recent full backup of the database 106 performed prior to the specific point in time. Accordingly, full backup 604 contains all data from database 106 at the time the full backup operation was performed. Further, as stated above, one or more additional incremental backups (not shown) may have been performed subsequent to the full backup 604 but prior to the specific point in time.

In the example, in response to the request, the database server 102 may, using the incremental backup manager 108, create a synthetic full backup 602 by merging the full backup 604, the incremental backup 206, and any incremental backups performed on the database subsequent to the full backup 604 but prior to the incremental backup 206. Accordingly, a full backup, synthetic full backup 602, corresponding to the time that the incremental backup was performed may be generated. The backup is referred to as a "synthetic" full backup because, in the illustrated embodiment, no full backup was generated at the specific point in time, but the synthetic full backup 602 may be used by a user as a typical full backup for the specific point in time.

Accordingly, the incremental backup system 100 may generate a full backup of the database 106 using the incremental backup 206 (with or without knowledge of the user or administrator). However, as discussed above, the incremental backup 206 and the full backup 604 may collectively use less storage space at the storage device 104, as compared to two full backups.

Figure 7:
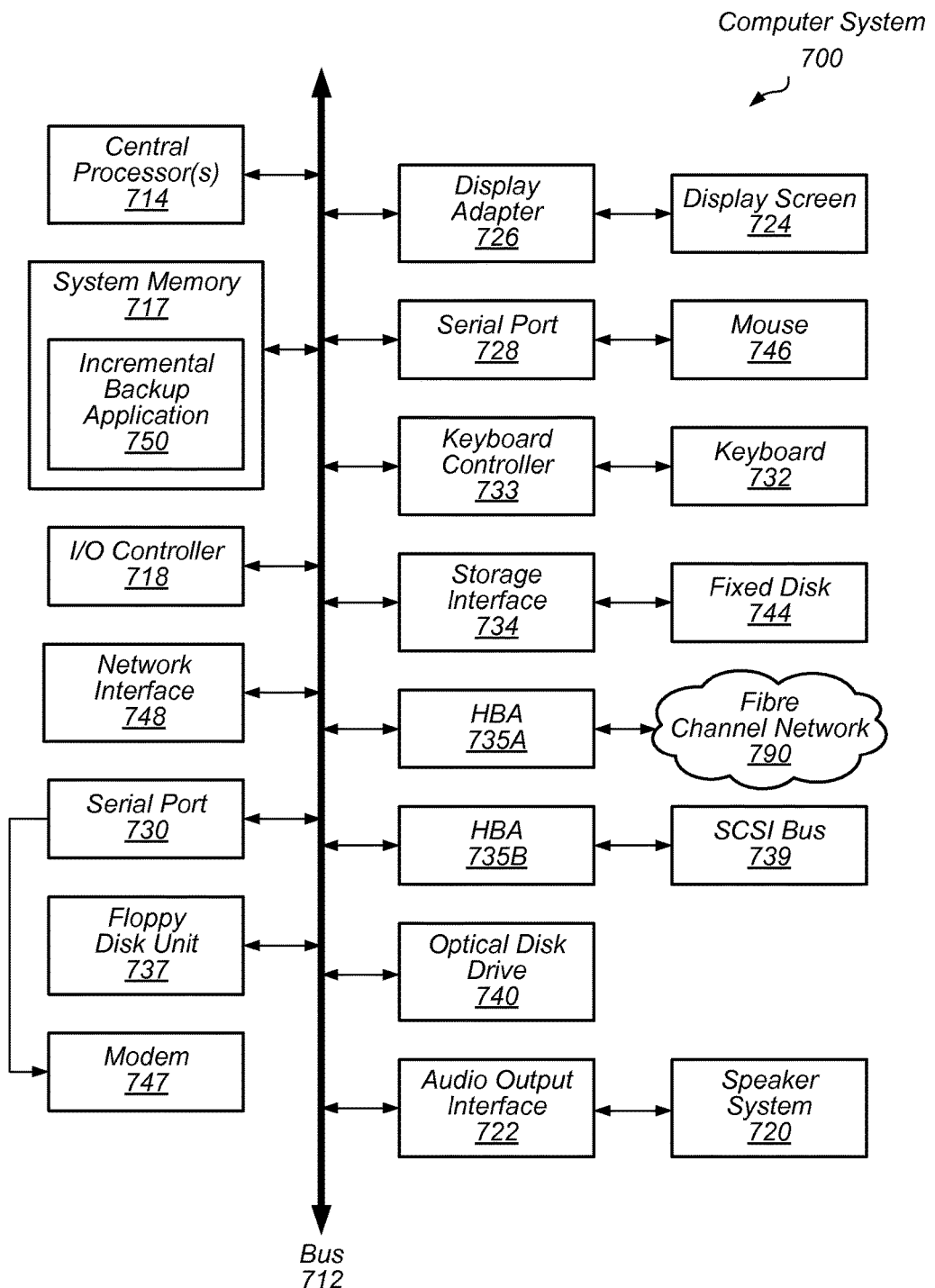
FIG. 7 is a block diagram illustrating an embodiment of a representative computer system that implements at least a portion of an incremental backup system.

Turning now to FIG. 7, a block diagram of one embodiment of a computer system 700 used to implement at least a portion of database server 102 is depicted. Computer system 700 includes a bus 712 which interconnects major subsystems of computer system 700, such as one or more central processor(s) 714, a system memory 717 (typically RAM, but which may also include ROM, flash RAM, or the like), an input/output (I/O) controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk unit 737 operative to receive a floppy disk, a host bus adapter (HBA) interface card 735A operative to connect with a Fibre Channel Network 790, a host bus adapter (HBA) interface card 735B operative to connect to a SCSI bus 739, and an optical disk drive 740 operative to receive an optical disk. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor(s) 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS), which controls basic hardware operation such as the interaction with peripheral components. Applications resident with computer system 700 are generally stored on and accessed via a computer readable medium, such as a hard disk drive (e.g., fixed disk 744), an optical drive (e.g., optical disk drive 740), a floppy disk unit 737, or other storage medium. Additionally, applications can be in the form of electronic signals modulated in accordance with the application and data communication technology when accessed via modem 747 or network interface 748. System memory 717 may comprise program instructions (such as incremental backup application 750) to implement various techniques described below.

Storage interface 734, as with the other storage interfaces of computer system 700, can connect to a standard computer readable medium for storage and/or retrieval of information, such as a fixed disk 744. Fixed disk 744 may be a part of computer system 700 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. The operation of a computer system such as that shown in FIG. 7 is readily known in the art and is not discussed in detail in this application. Code to implement the present disclosure can be stored in computer-readable storage media such as one or more of system memory 717, fixed disk 744, optical disk, or floppy disk. The operating system provided on computer system 700 may be MS-DOS, MS-WINDOWS, OS/2, UNIX, LINUX, or another known or suitable operating system.

Moreover, regarding any signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 8:
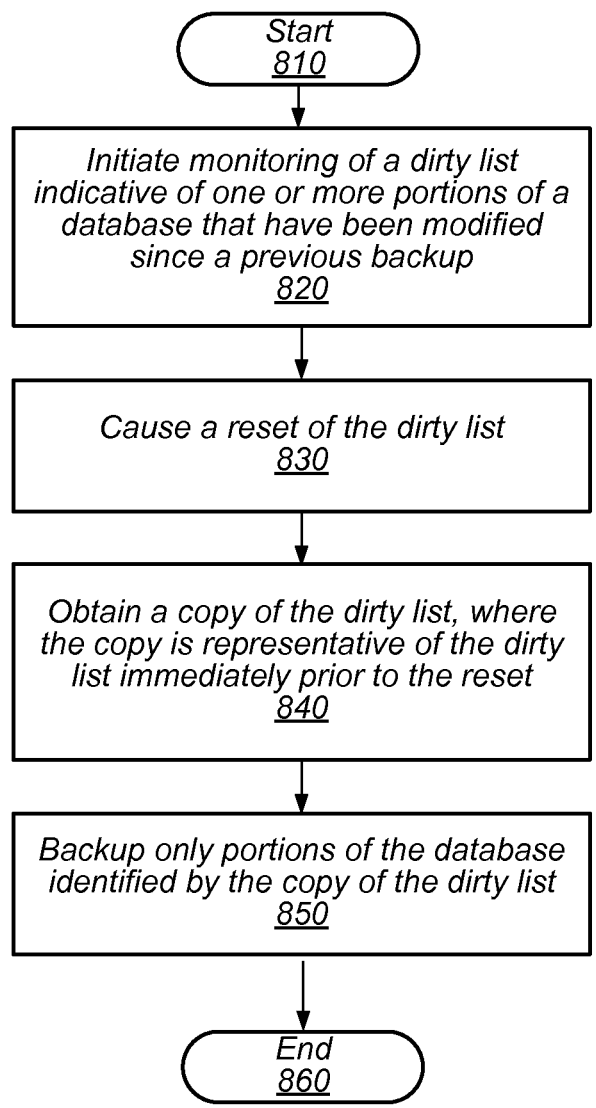
FIG. 8 is a generalized flow diagram illustrating one embodiment of an incremental backup operation.

Referring now to FIG. 8, a flow diagram of a method 800 is depicted. Method 800 is an embodiment of a method for performing an incremental backup of a database, such as the database 106. In some embodiments, the method 800 may be initiated or performed by one or more processors in response to one or more instructions stored by a computer-readable storage medium. For purposes of discussion, the elements of this embodiment are shown in sequential order. It should be noted that in various embodiments of the method 800, one or more of the elements described may be performed concurrently, in a different order than shown, or may be omitted entirely. Other additional elements may also be performed as desired.

Method 800 starts at 810, and then at 820, the method 800 includes initiating monitoring of a dirty list indicative of one or more portions of a database that have been modified since a previous backup. For example, the method 800 may include the incremental backup manager 108 sending a request to the filter driver 110, initiating monitoring (by the filter driver 110) of the dirty block list 114, where the dirty block list 114 indicates portions of the database 106 that have been modified since a previous backup.

At 830, the method 800 includes causing a reset of the dirty list. For example, the method 800 may include the incremental backup manager 108 sending, to the database manager 112, a request to perform a full backup of the database 106. In response to the request to perform the full backup, the database manager 112 may reset the dirty block list 114. As discussed above, in some embodiments, resetting the dirty block list 114 includes modifying the dirty block list 114 such that the dirty block list 114 indicates that none of the database 106 has been modified since a most recent backup. In other embodiments, resetting the dirty block list 114 includes modifying the dirty block list 114 such that the dirty block list 114 indicates that particular, defined portions of the database 106 (e.g., system blocks or header portions) have been modified since a most recent backup.

At 840, the method 800 includes obtaining a copy of the dirty list. The copy may be representative of the dirty list immediately prior to the reset. For example, the method 800 may include the incremental backup manager 108 receiving, from the filter driver 110, the copy of the dirty block list 202. The copy of the dirty block list 202 may be representative of the dirty block list 114 as the dirty block list 114 immediately prior to the reset. Accordingly, the copy of the dirty block list 202 may identify portions of the database 106 that were modified during a time period from a previous reset of the dirty block list 114 (e.g., corresponding to another incremental backup of the database 106 or to a full backup of the database 106) to the reset of the dirty block list 114.

At 850, the method 800 includes backing up only portions of the database identified by the copy of the dirty list. For example, the method 800 may include the incremental backup manager 108 only saving portions of the database 106 (e.g., as indicated by the snapshot 204) indicated by the copy of the dirty block list 202 as the incremental backup 206. In other embodiments, the incremental backup manager 108 may save other portions of the database (not indicated by the copy of the dirty block list 202) to the incremental backup 206, such as header information or particular system blocks. After 850, the method 800 may end at 860.

In some embodiments, initiating monitoring the dirty list at 820 further includes a request to enable the filter driver. For example, the filter driver 110 may be inactive prior to 820 and the incremental backup manager 108 sending the request to the filter driver 110 may further enable the filter driver. Additionally, prior to ending at 860, the method 800 may further include a request to disable the filter driver. For example, after receiving the copy of the dirty block list 202 (e.g., before generating the incremental backup 206 or after generating the incremental backup 206), the incremental backup manager 108 may send, to the filter driver 110, a request to disable the filter driver 110. In a system where the filter driver is enabled only after receiving the request to monitor the dirty list and until sending the copy of the dirty list, in some cases, may have better performance, as compared to a system where the filter driver is constantly enabled (e.g., due to the filter driver not monitoring the dirty list every time it is updated).

In another embodiment, prior to ending at 860, the method 800 includes the incremental backup manager 108, the database manager 112, or another entity (e.g., the client device 118) sending a request to the filter driver 110 to translate a memory request that addresses the database 106, where the database 106 is not configured to respond to the memory request without the translation (e.g., because the database 106 cannot understand the memory request without the translation). Accordingly, an existing filter driver may be used as the filter driver 110.

Figure 9:
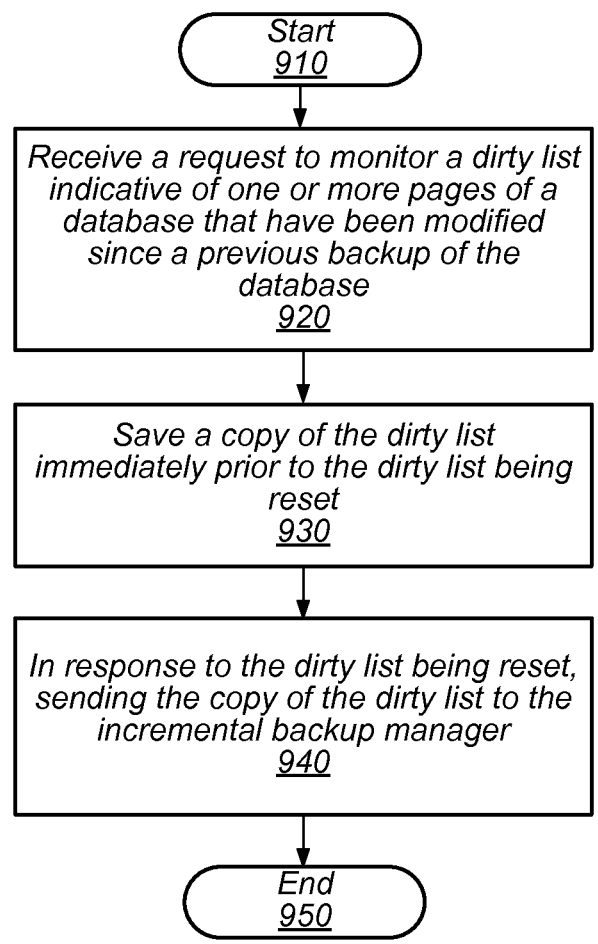
FIG. 9 is a generalized flow diagram illustrating one embodiment of a process performed by a filter driver during an incremental backup operation.

Referring now to FIG. 9, a flow diagram of a method 900 is depicted. Method 900 is an embodiment of a process performed by a filter driver, such as the filter driver 110, during an incremental backup operation of a database, such as the database 106. In some embodiments, the method 900 may be initiated or performed by one or more processors in response to one or more instructions stored by a computer-readable storage medium. For purposes of discussion, the elements of this embodiment are shown in sequential order. It should be noted that in various embodiments of the method 900, one or more of the elements described may be performed concurrently, in a different order than shown, or may be omitted entirely. Other additional elements may also be performed as desired.

Method 900 starts at 910, and then at 920, the method 900 includes receiving a request to monitor a dirty list indicative of one or more pages of a database that have been modified since a previous backup of the database. For example, the method 900 may include the filter driver 110 receiving a request, from the incremental backup manager 108, to monitor the dirty block list 114. The dirty block list 114 may be indicative of one or more pages (e.g., one or more portions) of the database 106 that have been modified since a previous backup of the database 106.

At 930, the method 900 includes saving a copy of the dirty list immediately prior to the dirty list being reset. For example, the method 900 may include the filter driver 110 saving a copy of the dirty block list 114 as the copy of the dirty block list 202. The copy of the dirty block list 202 may reflect the dirty block list 114 immediately prior to the dirty block list 114 being reset.

As described above with reference to FIG. 4, in some embodiments, saving the copy of the dirty list is performed in response to the filter driver detecting a reset indication that addresses the dirty block list. For example, the filter driver 110 may detect a reset indication that includes a write request that addresses a memory location corresponding to the dirty block list 114. The reset indication may further include a reset dirty block list that indicates that no files of the database 106 have been modified. As another example, the filter driver 110 may detect a freeze operation that addresses the database 106, where the freeze operation is indicative of a reset operation that addresses the dirty block list 114. In response to the reset indication, the filter driver may copy contents of the dirty list to a copy of the dirty list. For example, the filter driver 110 may, in response to the reset indication, copy contents of the dirty block list 114 to the copy of the dirty block list 202. Accordingly, when the dirty block list 114 is reset, the copy of the dirty block list 202 may contain the contents of the dirty block list 114 immediately prior to the dirty block list 114 being reset.

As described above with reference to FIG. 5, in a particular embodiment, saving the copy of the dirty list is performed in response to the request to monitor the dirty list at 920 (e.g., without detecting a reset indication). The copy of the dirty list may be updated to reflect updates to the dirty list during a time period between when the copy of the dirty list is generated and when the dirty list is reset. For example, in response to the request from the incremental backup manager 108, the filter driver 110 may copy contents of the dirty block list 114 to the copy of the dirty block list 202. If the dirty block list 114 is updated subsequent to the filter driver 110 copying the contents of the dirty block list 114 to the copy of the dirty block list 202, the filter driver 110 may cause a corresponding update at the copy of the dirty block list 202. Accordingly, when the dirty block list 114 is reset, the copy of the dirty block list 202 may contain the contents of the dirty block list 114 immediately prior to the dirty block list 114 being reset.

At 940, the method 900 includes in response to the dirty list being reset, sending the copy of the dirty list to the incremental backup manager. For example, the method 900 may include the filter driver 110, in response to the dirty block list 114 being reset, sending the copy of the dirty block list 202 to the incremental backup manager 108. After 940, the method 900 may end at 950.

Figure 10:
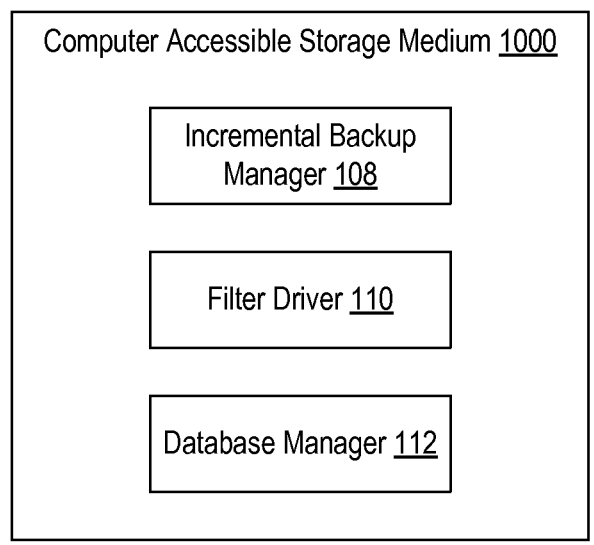
FIG. 10 is a block diagram illustrating one embodiment of a computer accessible storage medium that stores instructions used to implement at least a portion of an incremental backup system.

Turning now to FIG. 10, a block diagram of a computer accessible storage medium 1000 is shown. The computer accessible storage medium 1000 may store program instructions executable by one or more processors to implement various functions described above, such as functions performed by the incremental backup manager 108, filter driver 110, and/or database manager 112. Generally, the computer accessible storage medium 1000 may store any set of instructions which, when executed, implement a portion or all of the functions described above with respect to generating a backup of and/or using the database 106.

Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A non-transitory computer-readable storage medium one or more computer-executable instructions that, when executed by at least one processor of a computing device, cause the computing device to carry out operations comprising:
    performing an incremental backup of a database relative to a previous backup, including:
        initiating monitoring of a dirty list indicative of one or more portions of the database that have been modified since the previous backup, wherein initiating monitoring the dirty list includes sending, to a filter driver, a request to monitor the dirty list;
        causing a reset of the dirty list;
        obtaining a copy of the dirty list, wherein the copy is representative of the dirty list immediately prior to the reset, and wherein obtaining the copy of the dirty list includes receiving the copy of the dirty list from the filter driver; and
        backing up only portions of the database identified by the copy of the dirty list.

2. The non-transitory computer-readable storage medium of claim 1, wherein a database manager of the database does not natively support the incremental backup.

3. The non-transitory computer-readable storage medium of claim 1, wherein causing the reset of the dirty list includes requesting a full backup of the database.

4. The non-transitory computer-readable storage medium of claim 1, wherein the request to monitor the dirty list includes a request to enable the filter driver.

5. The non-transitory computer-readable storage medium of claim 4, wherein the operations further comprise, in response to receiving the copy of the dirty list, sending, to the filter driver, a request to disable the filter driver.

6. The non-transitory computer-readable storage medium of claim 1, wherein the operations further comprise sending, to the filter driver after performing the incremental backup, a request for the filter driver to translate a memory request that addresses the database, wherein the database is not configured to respond to the memory request without translation.

7. The non-transitory computer-readable storage medium of claim 1, wherein the operations further comprise generating a full backup of the database, including:
    retrieving a previous full backup of the database; and
    applying one or more incremental backups of the database to the previous full backup, wherein the one or more incremental backups include the incremental backup.

8. A non-transitory computer-readable storage medium one or more computer-executable instructions that, when executed by at least one processor of a computing device, cause the computing device to carry out operations comprising:
    generating an incremental backup of a database, including:
        sending, to a filter driver, a request to monitor a dirty block list indicative of one or more particular files of the database that have been modified since a previous backup of the database;
        sending, to a database manager, a request for a full backup of the database, wherein the full backup causes a reset of contents of the dirty block list;
        receiving, from the filter driver, a copy of the dirty block list, wherein the copy includes the contents of the dirty block list immediately prior to the reset; and
        saving, as part of the incremental backup, a copy of the one or more particular files indicated by the copy of the dirty block list.

9. The non-transitory computer-readable storage medium of claim 8, wherein the database manager does not natively support an incremental backup operation.

10. The non-transitory computer-readable storage medium of claim 9, wherein the database manager is a structured query language (SQL) server-based data manager.

11. The non-transitory computer-readable storage medium of claim 8, wherein the previous backup is a different incremental backup of the database.

12. The non-transitory computer-readable storage medium of claim 8, wherein the previous backup is a full backup of the database.

13. The non-transitory computer-readable storage medium of claim 8, wherein the filter driver is configured to generate the copy of the dirty block list in response to the request to monitor the dirty block list by:
    detecting a reset indication that corresponds to the reset of the contents of the dirty block list, wherein the reset indication includes a write request that addresses a memory location corresponding to the dirty block list, and wherein the reset indication further includes a reset dirty block list that indicates that no files of the database have been modified; and
    in response to the reset indication and prior to the reset, copying the contents of the dirty block list.

14. The non-transitory computer-readable storage medium of claim 8, wherein the filter driver is configured to generate the copy of the dirty block list in response to the request to monitor the dirty block list by:
    prior to the reset of the contents of the dirty block list, saving a copy of the dirty block list as a duplicate dirty block list; and
    in response to the reset, indicating the duplicate dirty block list as the copy of the dirty block list.

15. The non-transitory computer-readable storage medium of claim 14, wherein the filter driver is further configured to generate the copy of the dirty block list in response to the request to monitor the dirty block list by:
prior to the reset and after saving the copy of the dirty block list as the duplicate dirty block list, receiving an indication of an update to at least a portion of the contents of the dirty block list; and
performing an update to the duplicate dirty block list that corresponds to the update to the dirty block list.

16. A method, comprising:
receiving, at a filter driver from an incremental backup manager, a request to monitor a dirty list indicative of one or more pages of a database that have been modified since a previous backup of the database;
saving, by the filter driver, a copy of the dirty list immediately prior to the dirty list being reset; and
in response to the dirty list being reset, sending, by the filter driver, the copy of the dirty list to the incremental backup manager.

17. The method of claim 16, wherein saving the copy of the dirty list is performed in response to detecting a freeze operation that addresses the database, wherein the freeze operation is indicative of a reset operation that addresses the dirty list.

18. The method of claim 16, wherein saving the copy of the dirty list includes:
in response the request to monitor the dirty list, generating a duplicate dirty list;
detecting an update to the dirty list indicative of one or more additional pages of the database have been modified;
performing an update to the duplicate dirty list that corresponds to the update to the dirty list; and
detecting the dirty list being reset, wherein the duplicate dirty list when the dirty list is reset is the copy of the dirty list immediately prior to the dirty list being reset.

19. The method of claim 16, wherein the filter driver is active only after receiving the request to monitor the dirty list and until the sending the copy of the dirty list.

* * * * *